(12) United States Patent
Serstad et al.

(10) Patent No.: US 12,202,673 B1
(45) Date of Patent: Jan. 21, 2025

(54) OPTIMIZED REPLACEMENT OF SORTATION ORDER RECEPTACLES

(71) Applicant: Tompkins Robotics, Inc., Orlando, FL (US)

(72) Inventors: James M. Serstad, Orlando, FL (US); Michael C. Futch, Cocoa, FL (US); Parthiban A. Mathavan, Cary, NC (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

(21) Appl. No.: 18/824,074

(22) Filed: Sep. 4, 2024

(51) Int. Cl.
| | |
|---|---|
| *G06F 7/00* | (2006.01) |
| *B65G 1/06* | (2006.01) |
| *B65G 1/127* | (2006.01) |
| *B65G 1/137* | (2006.01) |
| *B65G 61/00* | (2006.01) |

(52) U.S. Cl.
CPC .......... *B65G 1/1373* (2013.01); *B65G 1/065* (2013.01); *B65G 1/127* (2013.01); *B65G 61/00* (2013.01)

(58) Field of Classification Search
CPC ...... B65G 1/1373; B65G 1/065; B65G 1/127; B65G 61/00
USPC .......................................... 700/213–216, 223
See application file for complete search history.

(56) References Cited

U.S. PATENT DOCUMENTS 11,427,405 B1 * 8/2022 Theobald ............. B65G 1/0492

* cited by examiner

*Primary Examiner* — Yolanda R Cumbess
(74) *Attorney, Agent, or Firm* — Parthiban A Mathavan

(57) ABSTRACT

System includes a server comprising a receptacle exchange engine, a receptacle, a shelf comprising a plurality of storage locations, and a frame positioned adjacent the shelf. The frame includes a lift traveling about a vertical rail. The vertical rail translating horizontally about two guide tracks arranged parallel to one another. The lift is configured for transferring the receptacle to a storage location of the shelf. System is configured to: determine that the receptacle containing one or more sorted articles is ready to be transferred and direct the lift to transfer the receptacle from an article receiving position to one of: (a) a storage location of the shelf, and (b) a position about a receptacle transport device.

20 Claims, 10 Drawing Sheets

OPTIMIZED REPLACEMENT OF SORTATION ORDER RECEPTACLES

TECHNICAL FIELD

This invention relates generally to the field of warehouse automation, and particularly to systems and methods for the automated replacement of sortation order receptacles.

BACKGROUND

Automated fulfillment of customer orders is becoming increasingly common with more businesses opting for automated filling operations to achieve economies of scale and to improve the overall efficiency of order fulfillment, particularly as online sales increases and as "just in time" (JIT) delivery to retail locations is becomes common. Order fulfillment often includes automated sortation processes where articles are automatically delivered to receptacles, where each receptacle is associated with an order. When a sorter completes an order, the receptacle carrying the articles associated with that order needs to be removed and taken to location for further processing. However, the labor required to remove the receptacles, take the receptacles to the location for further processing, and replace them with an empty receptacle can be costly. Furthermore, space limitations pose a challenge to fitting order filling equipment and filled receptacles waiting further processing, all within a limited footprint particularly when expanding the footprint is impracticable or prohibitively expensive. Adding to this is the fact that sorting equipment can take up substantial portions of warehouse space, is limited in the volume of packages that can be sorted, and is significantly underutilized at less than peak periods. The ergonomics of removing receptacles manually degrades as the order fulfilling equipment is built taller.

Accordingly, a need exists for an improved sorting solution for parcels and articles that would permit an automated filling system to minimize labor, better utilize available space capacity and perform the receptacle movements in an optimal manner.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, an improved article sorting system includes a server comprising a memory, a processor, and a receptacle exchange engine. The system further includes: a receptacle; a shelf comprising a plurality of storage locations arranged in one or more levels; and, a frame positioned adjacent the shelf. The frame includes a lift traveling about a vertical rail, the lift configured for transferring the receptacle to a storage location of the shelf, the vertical rail translating horizontally about two guide tracks arranged parallel to one another. The system is configured to: determine, by the receptacle exchange engine, that the receptacle containing one or more sorted articles is ready to be transferred; and direct, by the receptacle exchange engine, the lift to transfer the receptacle from an article receiving position to one of: (a) a storage location of the shelf, and (b) a position about a receptacle transport device.

According to one embodiment, the system is further configured to direct, by the receptacle exchange engine, the lift to transfer an empty receptacle to the article receiving position. According to one embodiment, the system further includes two lifts, wherein a first lift transfers the receptacle from the article receiving position to a first storage location of the shelf and a second lift transfers an empty receptacle from a second storage location of the shelf to the article receiving position. According to one embodiment, the receptacle is transferred from the article receiving position to a receptacle-carrying surface of the lift by a manipulation of a transfer assembly of the lift. According to one embodiment, the transfer assembly comprises one or more of a: robotic picking machine, robotic pick-and-place machine, robotic pick-and-slide machine, robotic grasping assembly, robotic articulated arm with an end effector, mobile robot, lifting machine, dragging machine, suction divert machine, suction lift machine, hauling machine, forklifting machine, side-grip pulling machine, and sliding machine. According to one embodiment, the frame is one of: (a) fixedly attached to, and (b) removably attached to, the shelf. According to one embodiment, the lift is configured to receive: (a) a first receptacle on a first receptacle-carrying surface of the lift, and (b) a second receptacle on a second receptacle-carrying surface of the lift. According to one embodiment, the receptacle exchange engine determines that the receptacle is ready to be transferred after one of: (a) an order associated with the receptacle is completed, and (b) the receptacle is identified as being full. According to one embodiment, the article receiving position is proximal a platform raised from a floor, wherein the receptacle is placed on or about the floor, and wherein a computer controlled vehicle travels on the platform to sort articles into a plurality of receptacles. According to one embodiment, the two horizontal guide tracks run substantially parallel to an edge of the platform wherein a plurality of receptacles is placed in article receiving positions proximal an edge of the platform. According to one embodiment, the system further includes two or more platforms wherein a plurality of receptacles is placed in article receiving position proximal an edge of each platform. According to one embodiment, the article receiving position is proximal a floor, wherein the receptacle is placed on or about the floor, and wherein a computer controlled vehicle travels on a platform to sort articles into a plurality of receptacles. According to one embodiment, the system further includes a receptacle transport device, wherein the system is further configured to direct the lift to transfer the receptacle from the storage location of the shelf to the receptacle transport device, wherein the receptacle transport device transports the receptacle to a location of further processing. According to one embodiment, the system further includes a receptacle transport device, wherein the system is further configured to direct the lift to transfer an empty receptacle carried by the receptacle transport device to the storage location of the shelf. According to one embodiment, one or more of: (a) the shelf, and (b) the frame includes wheels for providing mobility. According to one embodiment, the receptacle is elevated from a floor at the article receiving position.

According to one or more embodiments, an improved article sorting method includes: determining, by a receptacle exchange engine, that a receptacle containing one or more sorted articles is ready to be transferred; directing, by the receptacle exchange engine, a lift to transfer the receptacle from an article receiving position to one of: (a) a storage location of a shelf, the shelf comprising a plurality of storage locations arranged in one or more levels, and (b) a position about a receptacle transport device. The receptacle exchange engine forms part of a server. The server further includes a memory, and a processor. A frame comprises the lift, wherein the lift travels about a vertical rail, wherein the frame is positioned adjacent the shelf, wherein the vertical rail translates horizontally about two horizontal guide tracks arranged parallel to one another.

According to one embodiment, the method further includes: directing, by the receptacle exchange engine, the lift to transfer an empty receptacle to the article receiving position. According to one embodiment, the method further includes directing the lift to transfer the receptacle from the storage location of the shelf to a receptacle transport device, wherein the receptacle transport device transports the receptacle to a location of further processing. According to one embodiment, the method further includes directing the lift to transfer an empty receptacle carried by a receptacle transport device to the storage location of the shelf.

According to one or more embodiments, an improved article sorting system includes: a server comprising a memory, a processor, and a receptacle exchange engine; a receptacle; a shelf comprising a plurality of storage locations arranged in one or more levels; and, a receptacle bank. The receptacle bank includes: a plurality of spaces for receiving receptacles; and a lift traveling about a vertical rail, the lift configured for transferring the receptacle to a storage location of the shelf, the vertical rail translating horizontally about two guide tracks arranged parallel to one another. The system is configured to: determine, by the receptacle exchange engine, that the receptacle containing one or more sorted articles is ready to be transferred; and direct, by the receptacle exchange engine, the lift to transfer the receptacle from an article receiving position to one of: (a) a storage location of the shelf, and (b) a position about a receptacle transport device.

According to one or more embodiments, an improved article sorting system includes: a server comprising a memory, a processor, and a receptacle exchange engine; a receptacle; and a shelf. The shelf includes: a plurality of storage locations arranged in one or more levels; and a frame attached to the one or more levels, the frame comprising: a lift traveling about a vertical rail, the lift configured for transferring the receptacle to a storage location of the shelf, the vertical rail translating horizontally about two guide tracks arranged parallel to one another. The system is configured to: determine, by the receptacle exchange engine, that the receptacle containing one or more sorted articles is ready to be transferred; and direct, by the receptacle exchange engine, the lift to transfer the receptacle from an article receiving position to one of: (a) a storage location of the shelf, and (b) a position about a receptacle transport device.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
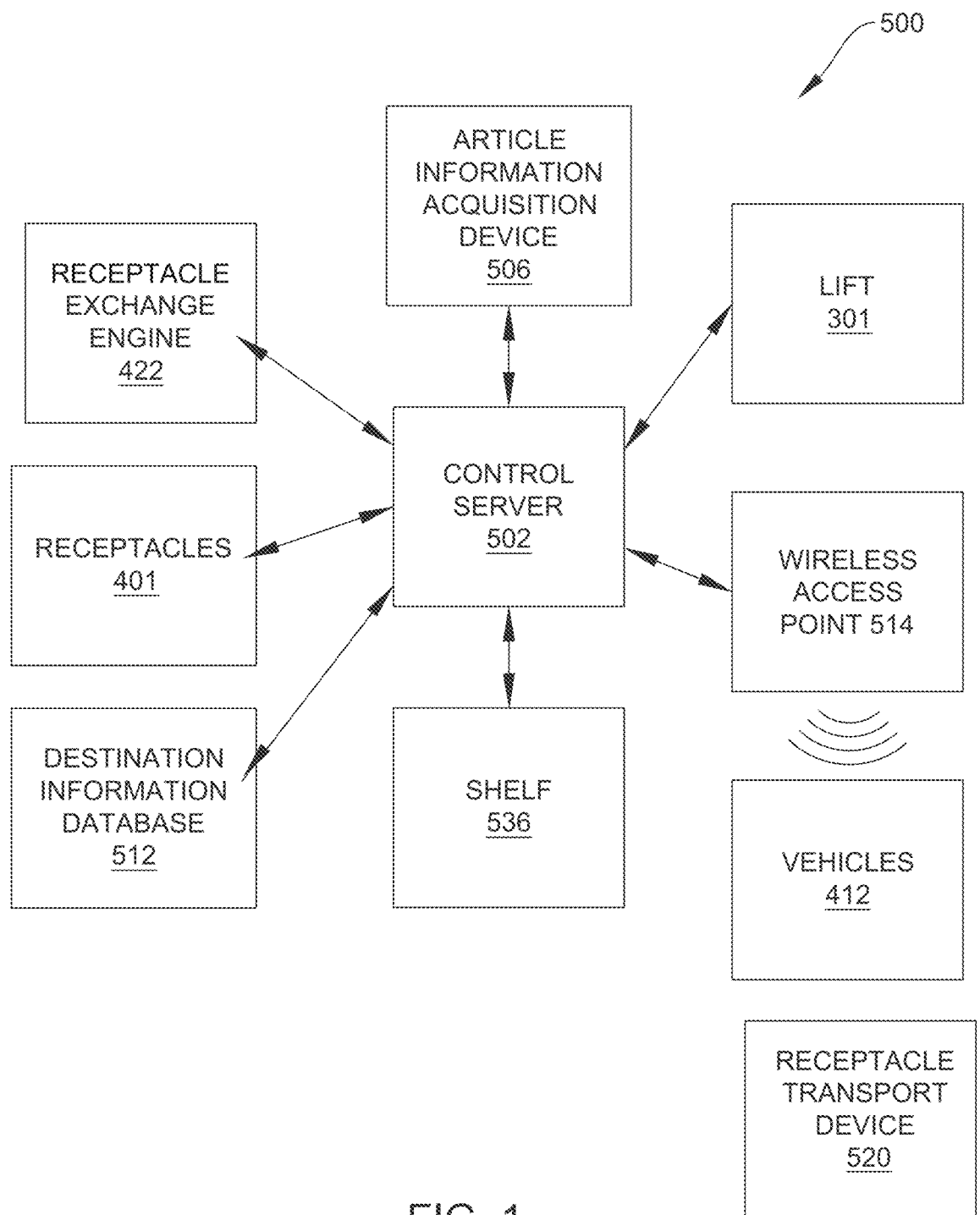
FIG. 1 depicts a block diagram of an improved sorting system for use in directing optimized replacement of sortation order receptacles, according to one or more implementations of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings.

As understood by persons skilled in the relevant art, automated order fulfillment can include automated sortation processes where articles are automatically delivered to receptacles, where each receptacle is associated with an order. When a sorter completes an order, the receptacle carrying the articles associated with that order needs to be removed and taken to location for further processing such as, for example, a packing station. However, space limitations pose a challenge to fitting all order filling equipment including filled receptacles waiting further processing, all within a limited footprint particularly when expanding the footprint is impracticable or prohibitively expensive. Further, sorting equipment can take up a large portion of warehouse space, is limited in the volume of packages that can be sorted, and may be significantly underutilized at less than peak periods. Also, the labor required to remove the receptacles, take them to the location for further processing, and replace them with an empty receptacle can be costly and the ergonomics of removing receptacles manually degrades as the order fulfilling equipment is built taller.

Embodiments of the presently disclosed subject matter advantageously overcome the limitations of the art by providing for systems, apparatus and processes that include a storage shelf, a frame positioned adjacent the shelf with the frame including a lift configured for transferring filled up receptacle to storage locations of the shelf or onto receptacle transport devices; the lift is further configured for transferring empty receptacles from the storage shelf or from a receptacle transport device onto an article receiving position of a sorter or sorting system. Such a set up permits, enables, or otherwise allows the efficient storage and swapping out of receptacles in a manner that saves space and time and improves the efficiency of the sorter by keeping the article receiving locations available. Space is saved because the storage shelf can be designed to be several vertical levels high without creating an ergonomic problem for human operators, while still being positioned right next to the sorter; time is saved because the lift can remove a filled receptacle as soon as it is filled without having to wait for a human, vehicle or device to remove the filled receptacle; time is further saved because the lift can replace an empty receptacle in the location from which the filled receptacle was removed right away without having to wait for a human, vehicle or device to place an empty receptacle in that location. Systems, apparatus, and processes disclosed herein can accordingly provide for an improved sorting solution for parcels and articles that optimizes available space capacity in a cost-effective manner while minimizing the time requirement associated with the replacement of a filled receptacle with an empty receptacle.

Figure 2:
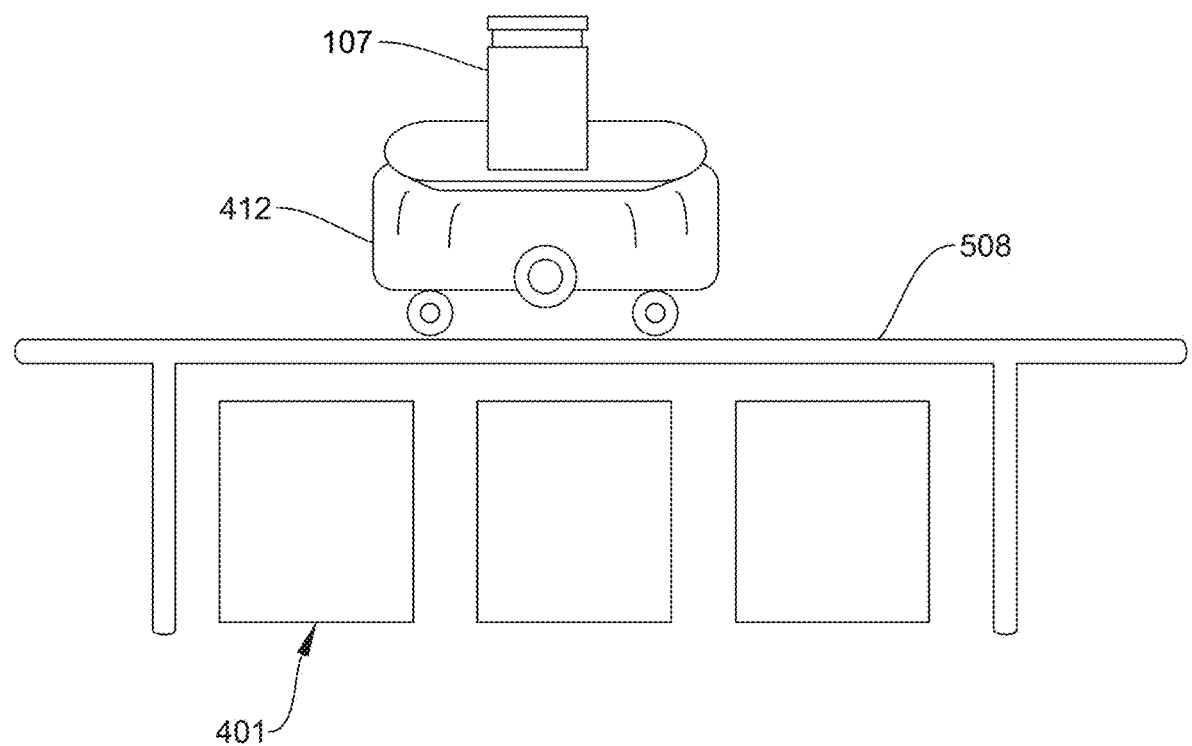
FIG. 2 depicts a side view of an implementation of an automated transport device traveling on a platform to transport an article to be sorted to a destination receptacle, according to one or more implementations of the presently disclosed subject matter.
Figure 3:
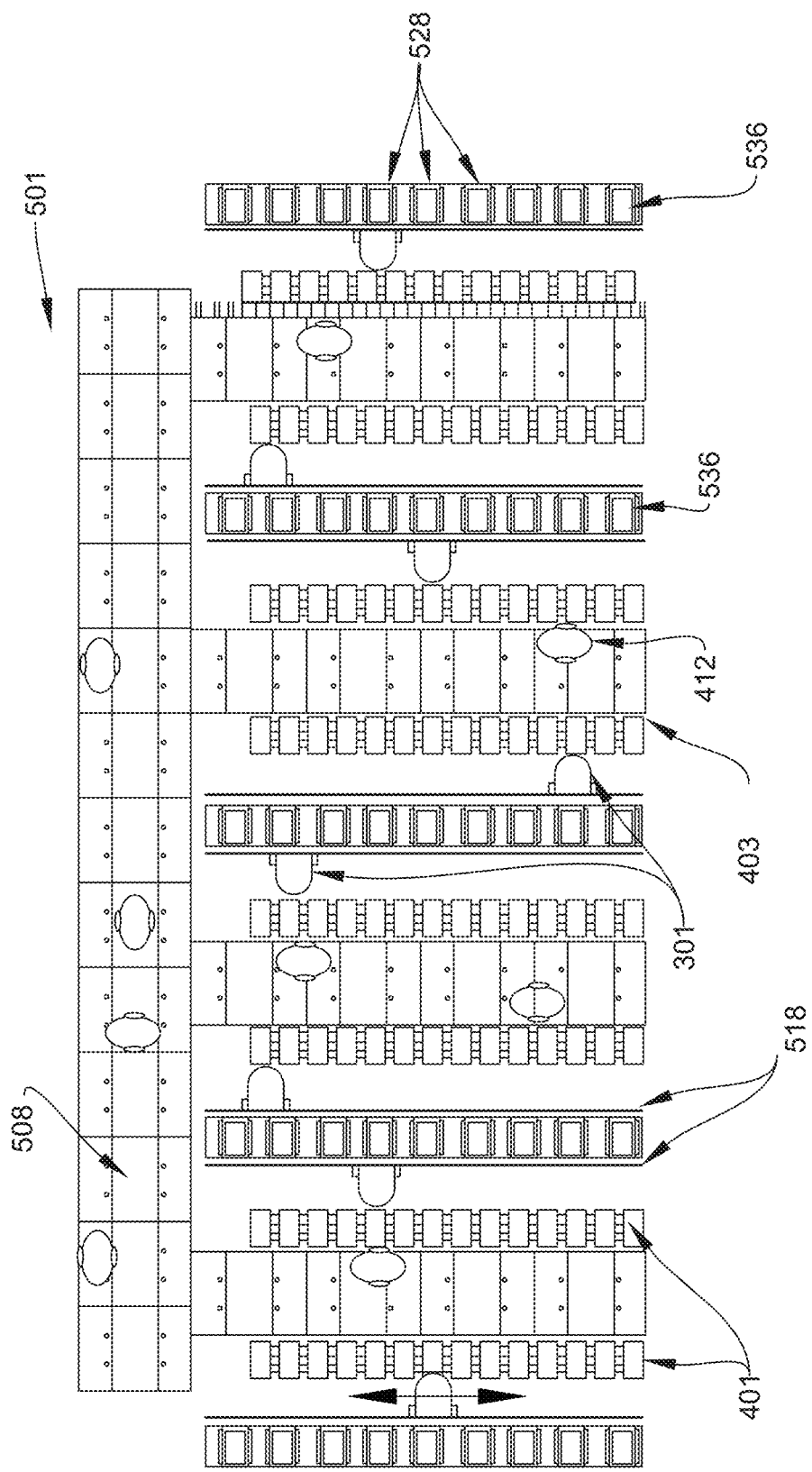
FIG. 3 depicts a top view of an improved sorting system for use in directing optimized replacement of sortation order receptacles, according to one or more implementations of the presently disclosed subject matter.
Figure 4:
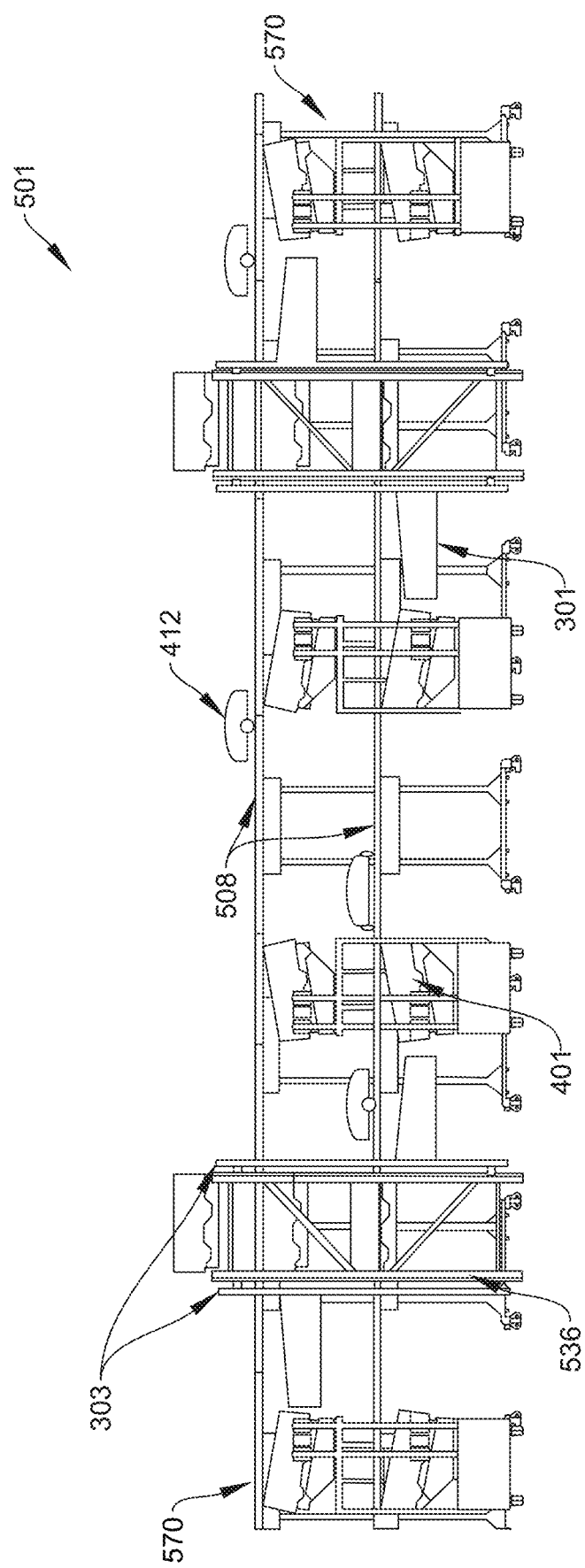
FIG. 4 depicts a side view of an improved sorting system for use in directing optimized replacement of sortation order receptacles, according to one or more implementations of the presently disclosed subject matter.
Figure 5:
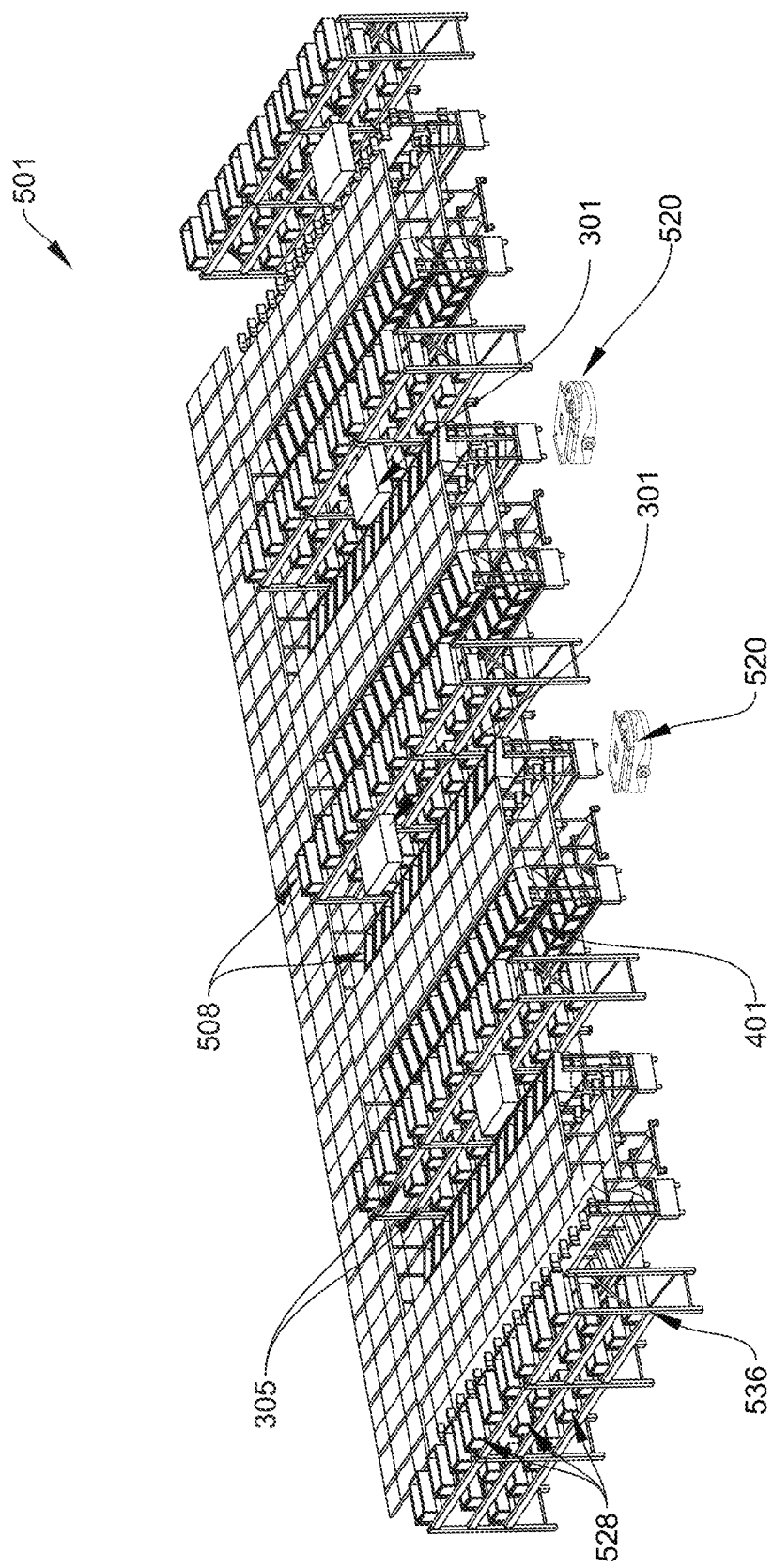
FIG. 5 depicts a side perspective view of an improved sorting system for use in directing optimized replacement of sortation order receptacles, according to one or more implementations of the presently disclosed subject matter.
Figure 6:
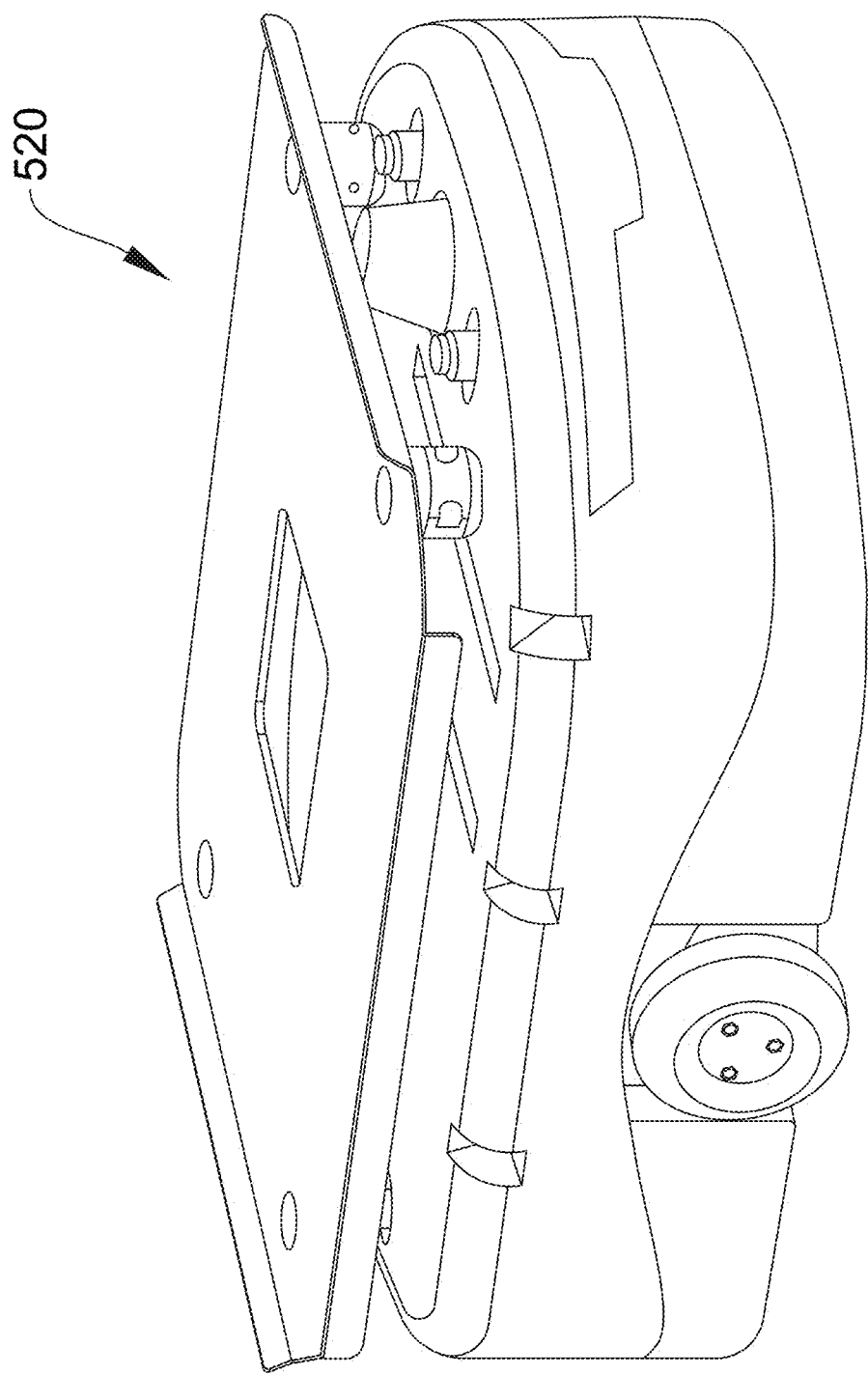
FIG. 6 depicts a side perspective view of a receptacle transport device, according to one or more implementations of the presently disclosed subject matter.
Figure 7:
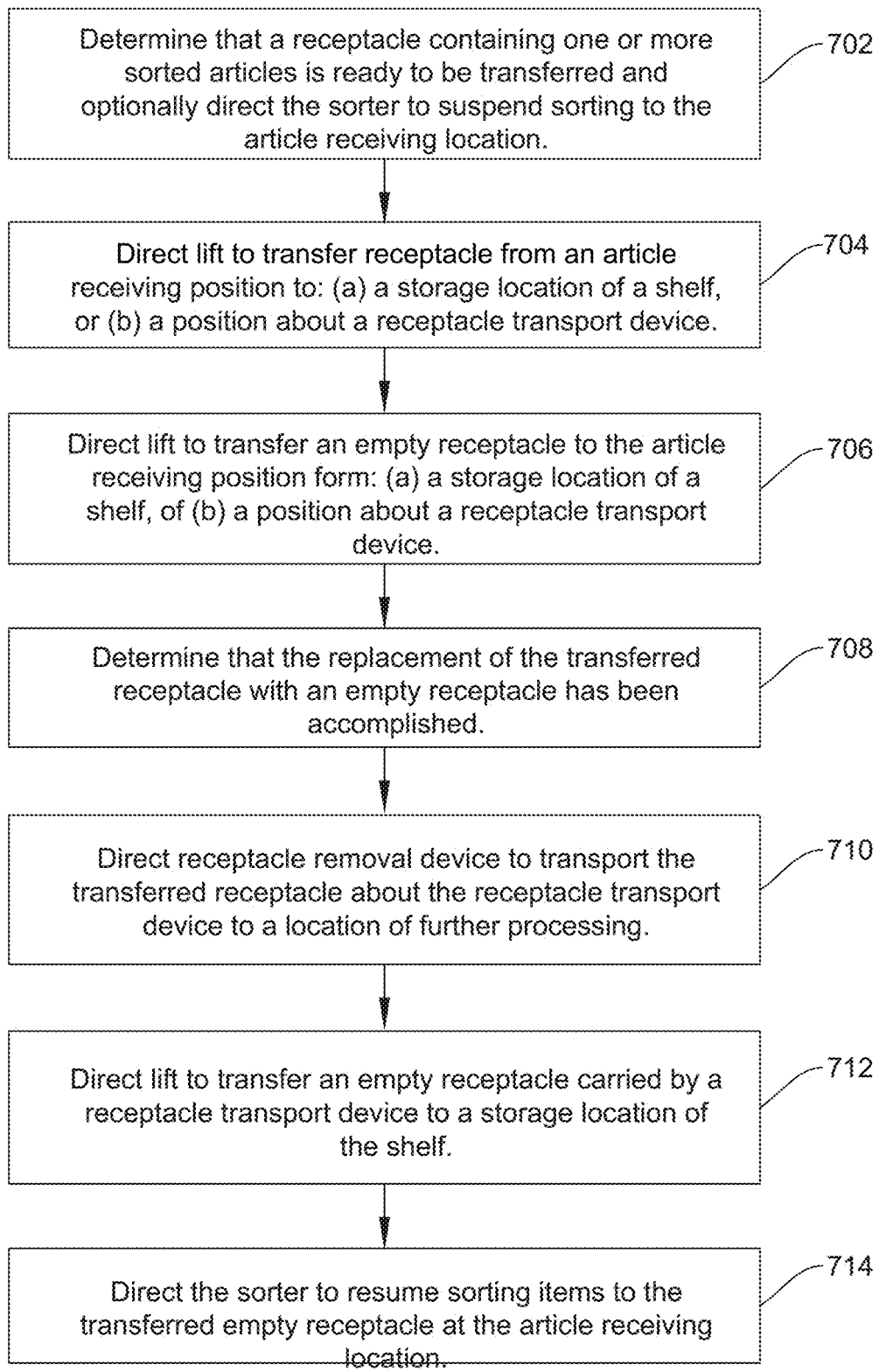
FIG. 7 depicts an exemplary flowchart of an exemplary implementation of an improved sorting system for use in directing optimized replacement of sortation order receptacles, according to one or more implementations of the presently disclosed subject matter.
Figure 8B:
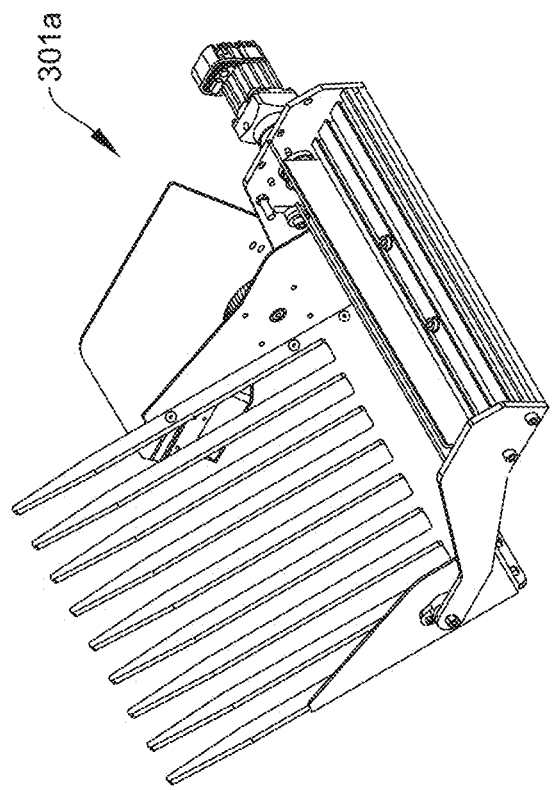
FIGS. 8A-8F depict exemplary transfer assembly mechanisms for transferring a receptacle from an article receiving position to a receptacle-carrying surface of the lift, according to one or more implementations of the presently disclosed subject matter.
Figure 8C:
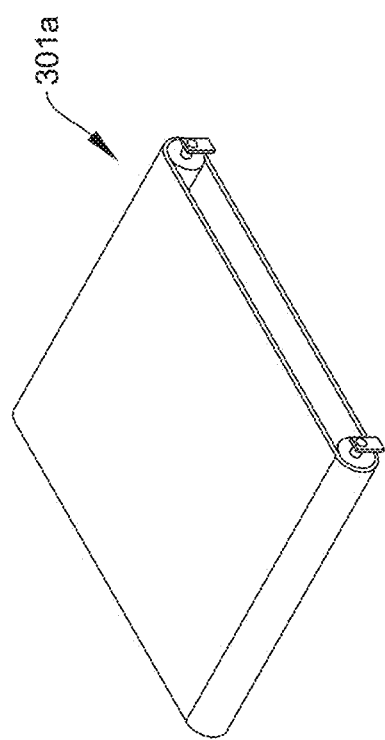
Figure 8A:
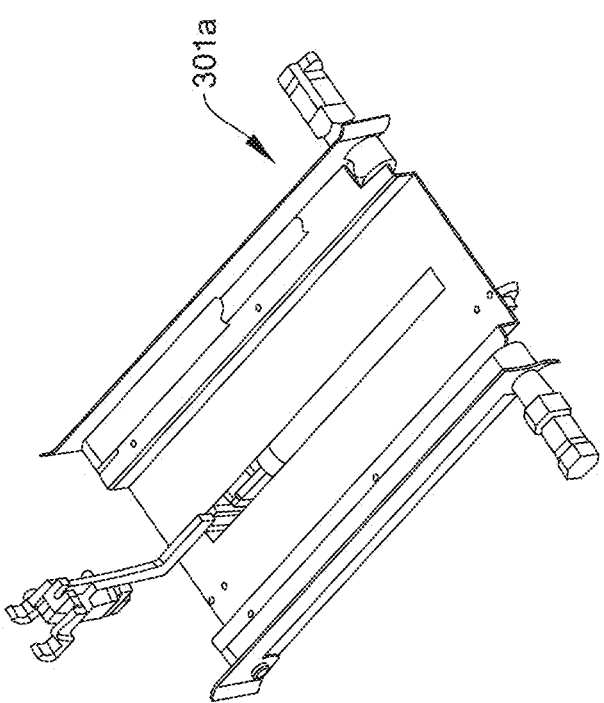
Figure 8E:
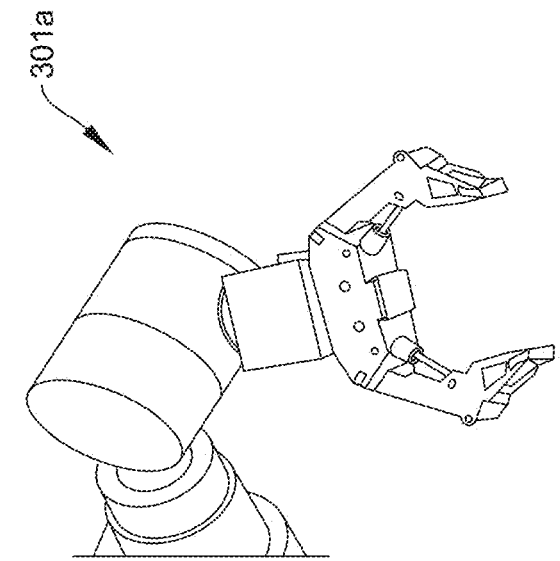
Figure 8D:
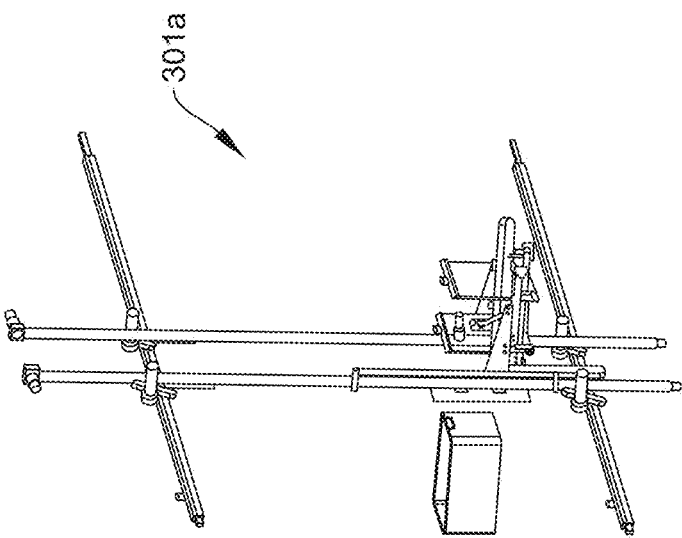
Figure 8F:
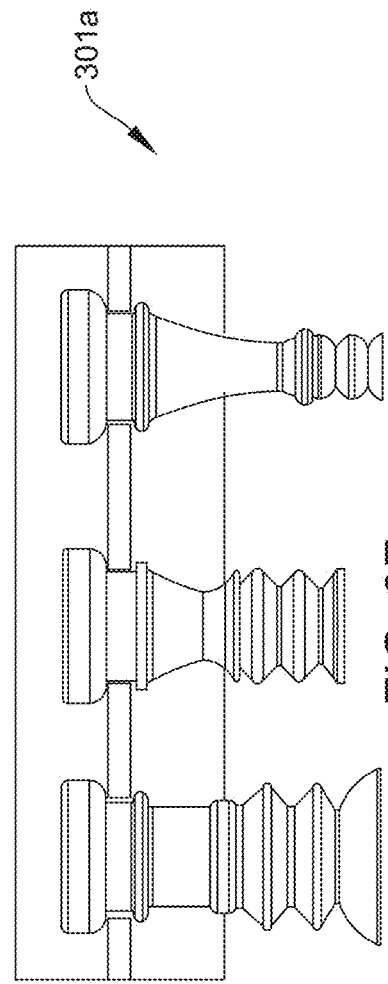
Figure 9:
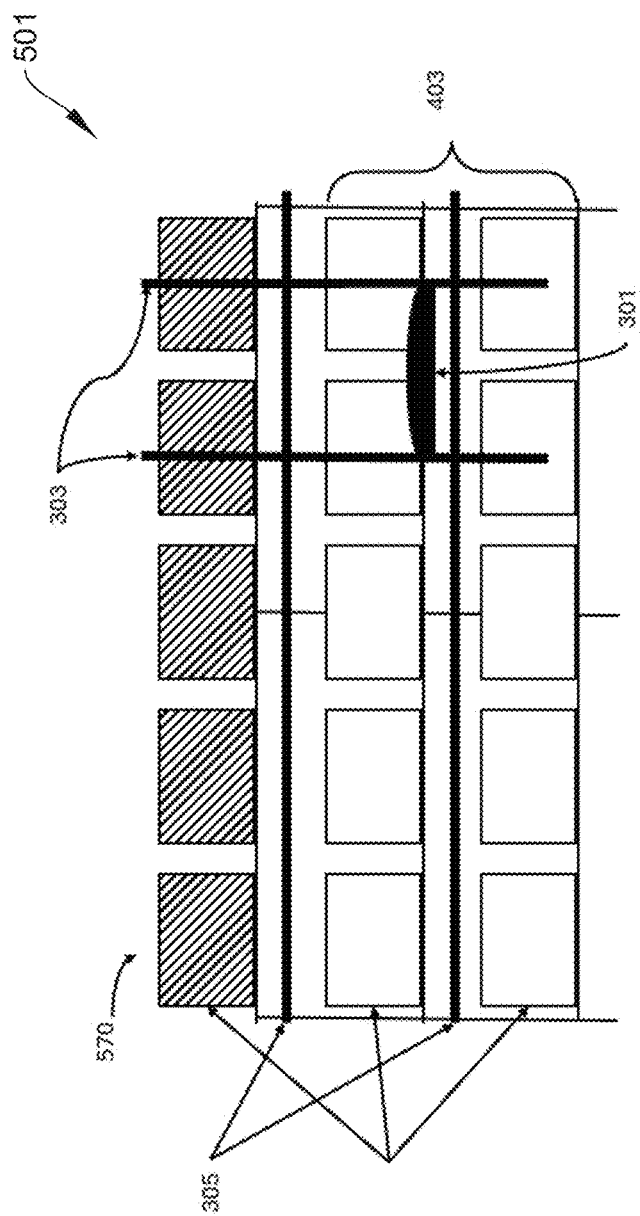
FIG. 9 depicts a side view of an improved sorting system for use in directing optimized replacement of sortation order receptacles, according to one or more implementations of the presently disclosed subject matter.

Embodiments disclosed herein provide for a sorting system for use in directing optimized replacement of sortation order receptacles. FIG. 1 depicts a block diagram of a sorting system for use in directing optimized replacement of sortation order receptacles. FIG. 2 depicts a side view of an implementation of an automated transport device traveling on a platform to transport an article to be sorted to a destination receptacle. FIG. 3 depicts a top view of a sorting system for use in directing optimized replacement of sortation order receptacles. FIG. 4 depicts a side view of a sorting system for use in directing optimized replacement of sortation order receptacles. FIG. 5 depicts a side perspective view of a sorting system for use in directing optimized replacement of sortation order receptacles. FIG. 6 depicts a side perspective view of a receptacle transport device. FIG. 7 depicts an exemplary flowchart of an exemplary implementation of an improved sorting system for use in directing optimized replacement of sortation order receptacles. FIGS. 8A-8F depict exemplary transfer assembly mechanisms of a lift for transferring a receptacle from an article receiving position to a receptacle-carrying surface of the lift. FIG. 9 depicts a side view of an improved sorting system for use in directing optimized replacement of sortation order receptacles.

FIG. 1 depicts a block diagram of an improved article sorting system 500 (hereinafter "system 500") for use in directing a sorting operation, according to one or more implementations of the presently disclosed subject matter. According to one embodiment, system 500 comprises a control server such as server 502. Server 502 comprises a memory, a processor; server 502 may further include or may otherwise be in communication with a destination information database 512, and a receptacle exchange engine 422. System 500 further comprises a plurality of receptacles 401, one or more receptacle transport devices 520, one or more shelves 536, and one or more lifts 301 operating on frames positioned adjacent shelf 536. Server 502 may optionally further be in communication with receptacles 401. Each receptacle 401 is configured for receiving one or more articles 107 (see FIG. 2) that are sorted thereinto.

According to various embodiments, system 500 further comprises an article information acquisition device 506 and one or more sets of shelves 536, each shelf 536 comprising a plurality of storage locations 528 arranged in one or more levels, for e.g., vertically in a rectangular layout. In one embodiment, system 500 further comprises a frame 518 positioned adjacent shelf 536. Frame 518 comprises at least one lift 301, one or more vertical rails 303, and one or more horizontal guide tracks 305. In one embodiment, frame 518 comprises a lift 301 traveling about one or more vertical rails 303. Lift 301 is configured for transferring the receptacle 401 from an article receiving position 403 to a storage location 528 of the shelf 536. In various embodiments, one or two vertical rails 303 translate horizontally about two horizontal guide tracks 305 arranged parallel to one another.

In various embodiments, system 500 is configured to: determine, for e.g., by receptacle exchange engine 422 or server 502, that a receptacle 401 containing one or more sorted articles is ready to be transferred. System 500 is further configured to: direct, for e.g., by receptacle exchange engine 422 or server 502, lift 301 to transfer receptacle 401 from an article receiving position 403 to one of: (a) a storage location 528 of shelf 536, and (b) a position about a receptacle transport device 520. In some embodiments, server 502 may, by itself or in combination with other components of system 500, perform the functions of receptacle exchange engine 422.

In at least one embodiment, as shown, for e.g., in FIG. 9, frame 518 and its components are integrated into receptacle bank 570. In at least one embodiment the lift forms part of the receptacle bank 570. As illustrated in FIG. 9, in one embodiment, one or more top rows of receptacle bank 570 includes storage locations for: (a) empty receptacles 401, and (b) buffering full receptacles 401; one or more lower rows of receptacle bank 570 include article receiving positions 403. Accordingly, in various embodiments, system comprises: a server comprising a memory, a processor, and a receptacle exchange engine; a receptacle; a shelf comprising a plurality of storage locations arranged in one or more levels; and a receptacle bank. The receptacle bank 570 comprises: a plurality of spaces for receiving receptacles; and a lift traveling about a vertical rail, the lift configured for transferring the receptacle to a storage location of the shelf, the vertical rail translating horizontally about two guide tracks arranged parallel to one another. System is configured to: determine, by the receptacle exchange engine, that the receptacle containing one or more sorted articles is ready to be transferred; and, direct, by the receptacle exchange engine, the lift to transfer the receptacle from an article receiving position to one of: (a) a storage location of the shelf, and (b) a position about a receptacle transport device. In some embodiments, the system is further configured to direct, by the receptacle exchange engine, the lift to transfer an empty receptacle to the article receiving position. In some embodiments, vertical rails 303 and a set of horizontal guide tracks 305 are not attached to shelf 536 but are rather attached to whatever is holding receptacles 401 in their article receiving locations, for e.g., in the form of receptacle bank 570. In some other embodiments, vertical rails 303 and a set of horizontal guide tracks 305 to the carts carrying receptacles or receptacle carts whereby the need for a separate "shelf" that runs down the middle of the aisle in the form of shelf 536 is eliminated.

In at least one embodiment, as can be inferred, for e.g., from FIG. 4, frame 518 and its components are integrated into shelf 536. In at least one embodiment the lift forms part of shelf 536. In such an embodiment, shelf 536 may either be stationary or mobile based on the requirements of the sorting operations. Accordingly, in some embodiments, shelf 536 comprises: a plurality of storage locations 528 arranged in one or more levels; and frame 518 attached to the one or more levels, with frame 518 comprising: lift 301 traveling about one or more vertical rails 303, the lift 301 configured for transferring the receptacle to a storage location 528 of shelf 536, the vertical rail(s) 303 translating horizontally about two guide tracks 305 arranged parallel to one another. System is configured to: determine, by the receptacle exchange engine 422, that a receptacle 401 containing one or more sorted articles 107 is ready to be transferred; direct, by the receptacle exchange engine 422, the lift to transfer the receptacle 401 from an article receiving position 403 to one of: (a) a storage location 528 of the shelf 536, and (b) a position about a receptacle transport device 520. Thus, in some embodiments, frame 518 is structurally incorporated into, and otherwise forms part of, shelf 536 such that both the frame and shelf together constitute a single unit. In some embodiments, vertical rails 303, and one or more horizontal guide tracks 305 are directly attached to shelf 536 (rather than being attached to frame 518). Accordingly, in some embodiments, the shelf may physically include the frame such that there is no separate frame provided.

In various embodiments, storage location 528 of shelf 536 operates as a buffering storage place for completed order receptacles 401 (e.g., a receptacle containing all articles associated with a respective order) or full receptacles 401 (e.g., a receptacle that is filled up and cannot accept any more articles) that will be transferred by lift 301 from the article receiving position 403 to the storage location 528 of the shelf 536. In at least some embodiments, storage location 528 of shelf 536 further operates as a buffering storage place for empty receptacles that can be transferred to storage locations 528 of the shelf 536 till such time that they need to be placed in an article receiving position 403; when needed, an empty receptacle can be transferred by lift 301 from storage location 528 of shelf 536 to the article receiving position 403. Having the empty receptacles 401 buffered close to the lift 301 operation area improves the speed at which receptacles 401 can be replaced at a vacant article receiving position 403. The speed of this exchange enhances the efficiency of the sorter 501 as it does not need to wait beyond a predetermined amount of time for a vacant article receiving position 403 to be replenished with an empty replacement receptacle 401 before continuing to sort items to that location.

Storage locations 528 of shelf 536 can advantageously help with buffering and replenishment. Specifically, storage locations 528 of shelf 536 can advantageously help with: (a) providing a temporary storage area for complete order receptacles and filled up (i.e., full) receptacles till they these receptacles get transported to a location of further processing, and (b) providing a temporary storage area for empty receptacles before they get transferred to an article receiving location near a sorting system; i.e., buffering of empty receptacles that can replace complete order receptacles or full receptacles. In one embodiment, system 500 may direct lift 301 to transfer an empty receptacle 401 from a storage location of shelf 536 to an article receiving position near a sorter 501 or a similar sorting system; alternately, system 500 may direct lift 301 to transfer an empty receptacle 401 from a position about a receptacle transport device 520 to the article receiving position near a sorting system. System 500 may further determine or confirm that the replacement of a transferred receptacle 401 with an empty receptacle 401 has been accomplished. System 500 may be further configured to direct receptacle transport device 520 to transport the transferred receptacle (i.e., the complete order receptacle or full receptacle that has been previously removed by lift 301 from article receiving position near a sorting system) onto or about a receptacle transport device 520 for transporting it to a location of further processing. System 500 may be further configured to direct lift 301 to transfer an empty receptacle 401 carried by or on or about a receptacle transport device 520 to a storage location 528 of shelf 536.

According to one embodiment, system 500 is further configured to direct, by receptacle exchange engine 422 or server 502, lift 301 to transfer an empty receptacle 401 to the article receiving position 403. According to one embodiment, system 500 may further comprise two lifts 301, wherein a first lift 301 transfers the order complete/full receptacle 401 from the article receiving position 403 to a first storage location 528 of shelf 536 while a second lift 301 transfers an empty receptacle 401 from a second storage location 528 of shelf 536 to the article receiving position 403. According to one embodiment, system 500 is configured to transfer a receptacle 401 from the article receiving position 403 to a receptacle-carrying surface of the lift 301 by a manipulation of a transfer assembly 301a of the lift.

FIGS. 8A-8F depict various exemplary transfer assembly mechanisms of lift 301 for transferring a receptacle 401 to a receptacle-carrying surface of lift 301. Transfer assembly 301a forms part of lift 301 and operates to perform the following functions. The transfer assembly 301a operates to transfer a receptacle from an article receiving position 403 to a receptacle-carrying surface of lift 301. The transfer assembly 301a also operates to transfer a receptacle from the receptacle-carrying surface of lift 301 to an article receiving position 403 of the lift 301. The transfer assembly 301a furthermore operates to transfer a receptacle from a storage location 528 to a receptacle-carrying surface of lift 301. The transfer assembly 301a additionally operates to transfer a receptacle from a receptacle-carrying surface of the lift 301 storage location 528 to a position about a receptacle transport device 520. Transfer assembly 301a also operates to transfer a receptacle from a position about a receptacle transport device 520 to a receptacle-carrying surface of lift 301. As illustrated in these figures FIGS. 8A-8F, transfer assembly 301a may take the form or otherwise comprise one or more of: robotic picking machines, robotic pick-andplace machines, robotic pick-and-slide machines, robotic grasping assemblies, robotic articulated arms with an end effectors, mobile robots, robotic lifting machines, robotic dragging machines, robotic suction divert machines, robotic suction lift machines, robotic hauling machines, and robotic sliding machines, fork lifting machines, side-grip pulling machines, suction cup pulling machines, telescoping grippers, and any other similar mechanisms as well understood by persons in the relevant art.

In one embodiment, transfer assembly 301*a* comprises a "dragging" machine in the form of mechanical gripper which has a hook that engages a handle on the receptacle 401 and pulls it out from an article receiving position 403 to a receptacle-carrying surface of lift 301. In this embodiment or in a different embodiment, transfer assembly 301*a* further includes a conveyor belt which makes up the receptacle-carrying surface of lift 301. This conveyor belt advantageously operates to move receptacle 401 on and off of lift 301.

Robotic picking machines are programmed to pick and place items, often equipped with vision systems to identify and handle goods accurately; they can take various forms, including: (a) industrial robotic arms programmed to pick and place items, often equipped with vision systems to identify and handle goods accurately; (b) autonomous mobile robots (AMRs) that transport items to and from an receptacle carrying surface of lift 301; and (c) pick and place robots that use a robotic arm and an end-effector, such as a gripper or vacuum system, to move receptacle to and from a receptacle carrying surface of lift 301.

Robotic pick-and-place machines are automated systems designed to handle and move receptacles to and from a receptacle carrying surface of lift 301 with precision and efficiency. Key components include: (a) robotic arm that serves as the mechanical extension responsible for precise movements; (b) end-effector that can take the form of a gripper, suction cup, or other tool that interacts with receptacles; and (c) sensors and vision systems that help the robot detect and accurately handle receptacles as they are transferred to and from a receptacle carrying surface of lift 301.

Robotic pick-and-slide machines are designed to pick receptacles from one location and slide them to another, often using a combination of robotic arms and conveyor systems. They are particularly useful for handling receptacles that need to be moved quickly and efficiently over short distances. Robotic pick-and-slide machines can include robotic arms equipped with grippers or suction devices to pick up items, and siding mechanisms such as conveyors or linear actuators, to move receptacles to and from a receptacle carrying surface of lift 301. Robotic pick-and-slide machines can also include sensors and vision systems to accurately identify and handle receptacles.

Robotic grasping assemblies refer to the components and mechanisms used by robots to grasp, hold, and manipulate receptacles. These assemblies are crucial for tasks that require precise handling and control of receptacles. Key elements of robotic grasping assemblies include: (a) end-effectors that are the "hands" of the robot, which can be grippers, suction cups, or other devices designed to interact with receptacles; (b) sensors that provide feedback on the position, force, and orientation of the receptacles being grasped, ensuring accurate and stable handling; (c) actuators that are the motors and mechanisms that drive the movement of the end-effectors; and, (d) control systems that coordinate the actions of the end-effectors, sensors, and actuators to achieve the desired grasp and manipulation of receptacles as they are transferred to and from a receptacle carrying surface of lift 301.

Robotic articulated arms with end effectors are advanced robotic systems and the components may include: (a) articulated arms with multiple joints (or axes) that allow for a wide range of motion, with these arms capable of mimicking the movements of a human arm, making them highly versatile for tasks that require complex movements; and (b) end effectors representing tools or devices attached to the end of the robotic arm. End effectors can be grippers, suction cups, welding torches, drills, or any other tool needed for a specific task. The end effector is what interacts directly with the receptacles being manipulated. The combination of articulated arms and end effectors allows for high precision, efficiency, and adaptability in automated receptacle replacement processes. Mobile robots are autonomous or semi-autonomous machines capable of moving receptacles to and from a receptacle carrying surface of lift 301.

Robotic lifting machines are automated systems designed to lift, move, and position heavy receptacles efficiently and safely. Key components include: (a) robotic arms that provide the lifting and movement capabilities, often with multiple joints for flexibility; (b) end effectors that represent tools attached to the robotic arm, such as grippers or suction cups, to securely hold and manipulate receptacles; (c) sensors that ensure precise control and safety by detecting the position and orientation of receptacles; and (d) control systems software that coordinates the movements and actions of the robotic arm and end effectors.

Robotic dragging machines are automated systems designed to move items by dragging them across surfaces and are typically used in environments where lifting or carrying items is impractical due to the weight or shape of the receptacles. Key features include: (a) drag mechanisms that can include hooks, clamps, or specialized grippers that attach to the items and drag them to the desired location on the receptacle carrying surface of lift 301; (b) sensors to ensure precise control and avoid obstacles during the dragging process; and (c) control systems software that coordinates the movement and ensures efficient operation.

Robotic suction divert machines are automated systems designed to handle and redirect receptacles using suction technology. These machines typically use vacuum-based end effectors to pick up receptacles and then divert them to the receptacle carrying surface of lift 301. Key features include: (a) suction-based end effectors that create a vacuum to securely hold and move receptacles; (b) sensors that detect the position and orientation of receptacles, ensuring accurate handling; and (c) control systems software that coordinates the suction and movement processes to efficiently divert receptacles to their designated locations.

Robotic suction lift machines are automated systems designed to lift and transport receptacles using suction technology. These machines typically use vacuum-based end effectors to create a secure grip on receptacles, allowing them to be lifted and moved efficiently. Key components include: (a) vacuum-based end effectors that create a vacuum seal to securely hold receptacles; (b) sensors that detect the position and orientation of receptacles, ensuring precise handling; and (c) control systems software that coordinates the suction and movement processes for efficient operation.

Robotic hauling machines are automated systems designed to transfer heavy receptacles. Key features include: (a) locomotion systems such as wheels, tracks, or legs, enabling the robot to move across a receptacle carrying surface of lift 301; (b) sensors to navigate the environment, avoid obstacles, and ensure precise movement; and (c) control systems software that coordinates the robot's actions, ensuring efficient and safe operation.

Robotic sliding machines are automated systems designed to move receptacles by sliding them along a surface. These machines typically use mechanisms such as prismatic joints, which allow for linear motion along a fixed axis. Key components include: (a) sliding mechanisms that can be linear actuators or other devices that enable smooth, controlled sliding motion; (b) sensors to detect the position and orientation of receptacles, ensuring precise handling; and (c) control systems software that coordinates the sliding motion and ensures efficient operation.

In some embodiments, lift 301 is configured to receive: (a) a first receptacle 401 on a first receptacle carrying surface of lift 301, and (b) a second receptacle 401 on a second receptacle carrying surface of lift 301. For example, in one implementation, the receptacle-carrying surface may be split into two regions each of which is independently controllable by system 500 to load or unload a receptacle 401 thereon.

In some embodiments, receptacle exchange engine 422 or server 502 determines that a receptacle 401 is ready to be transferred after one of: (a) an order associated with the receptacle is completed, and (b) server 502 identifies the receptacle 401 as being full. In some embodiments, article receiving position 403 is proximal platform 508 raised from a floor, wherein receptacle 401 is placed on or about the floor, and wherein a computer controlled device such as transport device 412 travels on platform 508 to sort articles 107 into one or more receptacles 401.

In some embodiments, frame 518 is fixedly attached to shelf 536. In some embodiments, frame 518 may be welded to or bolted to shelf 536. In some embodiments, frame 518 may form an integral part of shelf 536. In some embodiments, frame 518 may be removably attached to shelf 536. In some embodiments, frame 518 may be clipped on to shelf 536 through a clip-on mechanism. In some embodiments, frame 518 may be latched on to a receiving point of shelf 536 through a latching mechanism. In some embodiments, frame 518 may be temporarily linked to shelf 536 through a linking mechanism such as, for e.g., a chain link with end-effectors. Accordingly, in various embodiments, frame 518 is one of: (a) fixedly attached to, and (b) removably attached to, shelf 536.

In some embodiments, two horizontal guide tracks 305 run substantially parallel to an edge of platform 508 wherein a plurality of receptacles 401 is placed in article receiving positions 403 proximal an edge of platform 508. In some embodiments, system 500 comprises two or more platforms 508 wherein a plurality of receptacles 401 is placed in article receiving positions 403 proximal an edge of each platform 508. In some embodiments, the article receiving position 403 is proximal a floor, wherein the receptacle 401 is placed on or about the floor, and wherein a computer controlled vehicle such as transport device 412 travels on a platform (or optionally on the floor) to sort articles 107 into a plurality of destination receptacles such as receptacles 401. In some embodiments, shelf 536 includes wheels for providing mobility. In some embodiments, frame 518 includes wheels for providing mobility. In some embodiments, receptacles 401 are placed on or near a floor at the article receiving position 403. In some embodiments, receptacles 401 are placed elevated from a floor at the article receiving position 403.

In some embodiments, system 500 further comprises a receptacle transport device 520, wherein the system 500 is further configured to direct lift 301 to transfer the receptacle 401 from a storage location 528 of shelf 536 or from an article receiving position 403 to the receptacle transport device 520. Receptacle transport device 520 transports the receptacle to a location of further processing. In some embodiments, system 500 is further configured to direct lift 301 to transfer an empty receptacle 401 carried on or by receptacle transport device 520 to a storage location 528 of shelf 536 or to the article receiving position 403.

According to various embodiments, an improved article sorting method comprises determining, by receptacle exchange engine 422 or server 502, that a receptacle 401 containing one or more sorted articles is ready to be transferred. The method further comprises directing, by the receptacle exchange engine 422 or by server 502, lift 301 to transfer the receptacle 401 from an article receiving position 403 to a storage location 528 of a shelf 536. Shelf 536 comprises a plurality of storage locations 528 arranged in one or more levels. In one embodiment, the method additionally comprises directing, by the receptacle exchange engine 422 or by server 502, lift 301 to transfer the receptacle 401 from an article receiving position 403 to a position about a receptacle transport device 520. Frame 518 comprises lift 301. In one embodiment, lift 301 travels about one or more vertical rails 303. Frame 518 is positioned adjacent to shelf 536. In one embodiment, vertical rails 303 translate horizontally about one or more horizontal guide tracks 305 arranged parallel to one another.

In one embodiment, an improved article sorting method further comprises directing, by the receptacle exchange engine 422 or by server 502, lift 301 to transfer an empty receptacle 401 to the article receiving position 403. In one embodiment, the improved article sorting method also comprises directing by the receptacle exchange engine 422 or by server 502, lift 301 to transfer the receptacle 401 from the storage location 528 of shelf 536 to the receptacle transport device 520, wherein the receptacle transport device 520 transports the receptacle to a location of further processing. In one embodiment, the improved article sorting method furthermore comprises directing lift 301 to transfer an empty receptacle 401 carried by the receptacle transport device 520 to a storage location 528 of shelf 536.

FIG. 7 depicts an exemplary flowchart of an exemplary implementation of an improved sorting system for use in directing an optimized replacement of sortation order receptacles. At step 702, server 502 determines that a receptacle 401 containing one or more sorted articles 107 is ready to be transferred; optionally, server 502 further directs the sorter 501 to suspend sorting articles to the location of that receptacle 401. At step 704, server 502 directs lift 301 to transfer the "ready to be transferred" receptacle 401 from an article receiving position 403 to: (a) a storage location 528 of shelf 536, or (b) a position about a receptacle transport device 520, wherein receptacle transport device 520 may operate to transport the receptacle to a location of further processing. At step 706, server 502 directs lift 301 to transfer an empty receptacle 401 to an article receiving position 403 from: (a) a storage location 528 of shelf 536, or (b) a position about a receptacle transport device 520. At step 708, the server 502 determines or receives confirmation that the replacement of the transferred receptacle 401 with an empty receptacle 401 has been accomplished. At step 710, server 502 directs receptacle transport device 520 to transport the transferred receptacle 401 carried on or about the receptacle transport device 520 to a location of further processing. At step 712, server 502 directs lift 301 to transfer an empty receptacle 401 carried by receptacle transport device 520 to a storage location 528 of shelf 536. At step 714, server 502 directs sorter 501 to resume sorting articles 107 to the transferred empty receptacle 401 at the article receiving position 403.

As illustrated in FIG. 9, in one embodiment, one or more top rows of receptacle bank 570 includes storage locations for: (a) empty receptacles 401, and (b) buffering full receptacles 401; one or more lower rows of receptacle bank 570 include article receiving positions 403. In one implementation of the embodiment of FIG. 9, receptacle bank 570 includes: a plurality of spaces for receiving (a) empty receptacles 401, and (b) buffering full receptacles, and (c) receptacles 401 in article receiving positions 403. Receptacle bank 570 further includes lift 301 traveling about one or more vertical rails 303, with lift 301 configured for transferring a receptacle 401 to a storage location of receptacle bank 570, with vertical rails 303 translating horizontally about two guide tracks 305 arranged parallel to one another. The system is configured to: determine, by the receptacle exchange engine 422, that a receptacle 401 containing one or more sorted articles 107 is ready to be transferred; and direct, by the receptacle exchange engine 422, the lift 301 to transfer the receptacle 401 from an article receiving position 403 of receptacle bank 570 to one of: (a) a storage location of receptacle bank 570, and (b) a position about a receptacle transport device 520.

As illustrated in FIG. 4, according to one or more embodiments, shelf 536 includes: a plurality of storage locations arranged in one or more levels; and frame 518 attached to the one or more levels. In such an embodiment, shelf 536 may either be stationary or mobile based on the requirements of the sorting operations. Frame 518 comprises: lift 301 traveling about a vertical rail 303, with lift 301 configured for transferring a receptacle 401 to a storage location of shelf 536. The vertical rail 303 translates horizontally about two guide tracks 305 arranged parallel to one another. The system is configured to: determine, by the receptacle exchange engine 422, that a receptacle 401 containing one or more sorted articles 107 is ready to be transferred; and direct, by the receptacle exchange engine 422, the lift 301 to transfer the receptacle 401 from an article receiving position 403 to one of: (a) a storage location of the shelf 536, and (b) a position about a receptacle transport device 520.

Automated sortation is common in warehouses and distribution centers where items are delivered to receptacles, where each receptacle is related to at least one order. When the sorter completes an order, the receptacle needs to be removed and taken to location for further processing. This receptacle removal is typically done manually. Automating this receptacle removal has been an engineering challenge for which there does not currently exist an economical, reliable, and fast solution. The systems, methods and processes provided herein overcome such engineering challenge by advantageously providing solutions that are economical, reliable and fast, using lift 301 that travels in a vertical plane along two dimensions on a set of vertical rails 303 and a set of horizontal guide tracks 305, with lift 301 operating to retract or put in place a receptacle at in an article receiving position 403 at any location on the perimeter of a finger of sorter 501, wherein sorter 501 comprises several fingers connecting to a runaway.

In one embodiment, parallel horizontal rails in the form of horizontal guide tracks 305, at least 2 of them, are fixedly or removably attached to shelf 536. In one embodiment, the receptacle removal/transfer device in the form of lift 301 is slidingly attached to parallel vertical rails 303 such that lift 301 can slide up and down vertically along vertical rails 303. Vertical rails 303 are attached slidingly to horizontal guide tracks 305. Vertical rails 303 maintain their vertical orientation as they move or translate horizontally along horizontal guide tracks 305, powered by electric motors. Lift 301 moves vertically along vertical rails 303, powered by electric motors. The result is that lift 301 effectively moves in two dimensions and capable of reaching practically every point along a vertical plane such that it can access any storage location 528 of shelf 536 on any level on one side of sorter 501. In some embodiments, parallel horizontal guide tracks 305 are attached to a frame 518 that is parallel to shelf 536, with shelf 536 provided on the opposite side of lift 301 and with frame 518 positioned between shelf 536 and a bank of receptacles such as, for e.g., receptacle bank 570. For e.g., FIG. 3 illustrates such a set up where shelf 536 is arranged such that it runs down the middle of each horseshoe of platform 508 of sorter 501, all of which form part of system 500.

Sorter 501 of system 500 may be shaped in a straight line, or in a rectangle. In one embodiment, as shown in FIG. 3, sorter 501 may have fingers that extend from a highway. In all cases, there is at least one side of sorter 501 which has receptacles 401 arranged alongside it. In one embodiment, sorter 501 has more than one level so that receptacles 401 stacked vertically as well as arranged horizontally by placing the receptacles 401 on shelves in the form of receptacle banks 570 with one receptacle bank level provided for a corresponding level of sorter 501. For example, FIG. 4 shows two levels of receptacles provided in receptacle bank 570 to correspond with two platforms 508 provided on sorter 501.

In one embodiment, server 502 of system 500 directs the operations of sorter 501. In one embodiment, server 502 may direct the delivery or sortation of articles into receptacles 401 arranged on or about the floor along an edge of each platform 508 of sorter 501. When an order is complete, server 502 may indicate to the receptacle exchange engine 422 that the receptacle 401 needs to be replaced. Receptacle exchange engine 422 may then direct a crane such as, for e.g., lift 301 to remove receptacle 401 containing the completed order. When lift 301 is positioned proximal the completed order receptacle 401, a suitable transfer assembly 301a (see FIGS. 8A to 8F) of lift 301 will then operate to lift, pull, or otherwise relocate the completed order receptacle 401 out of the location on a receptacle carrying surface of lift 301. The pulling action can be performed by transfer assembly 301a using, for e.g., a mechanical arm which grabs the handle of receptacle 401, suction cups adhering to the side of receptacle 401, or a fork inserted under receptacle 401, or a conveyor belt inserted under the receptacle, or other means as illustrated in FIGS. 8A-8F, in addition to similar other transfer assembly means well known to persons of skill in the relevant art. Lift 301 will then transfer the receptacle placed on the receptacle carrying surface of lift 301 to a storage location 528 of shelf 536; in one alternate embodiment, lift 301 will transfer the receptacle placed on the receptacle carrying surface of lift 301 directly onto a stowing position about receptacle transport device 520, wherein the receptacle transport device 520 transports the receptacle 401 to a location of further processing.

In one embodiment, after lift 301 removes a receptacle 401, lift 301 places or put the receptacle 401 on a conveyance device which could be a conveyor belt; the conveyance device could alternately take the form of a floor-running robot such as, for e.g., receptacle transport device 520. In one embodiment, the conveyance device takes the receptacle 401 to a location for further processing. Alternatively, lift 301 may transfer the removed receptacle to a storage location 528 of shelf 536 for buffering. This way, if there is no conveyance device that is readily available to transport the removed receptacle 401, lift 301 does not need to wait. At a later time, when lift 301 does not have other tasks to perform, and when a conveyance device (such as, for e.g., a conveyor belt or receptacle transport device 520) is available, lift 301 will then pull receptacles 401 from the storage location 528 of shelf 536 (i.e., the buffer location) and place the receptacle onto the conveyance device. Lift 301 will then remove an empty receptacle 401 from a shelf 536 (that holds empty receptacles for replenishment) and places the empty receptacle 401 at the empty location in an article receiving position 403. By locating empty receptacles 401 near to each lift 301, the replenishment of a receptacle 401 to a vacant location can happen quickly. Each shelf 536 may be positioned parallel to one or more receptacle banks 570 along sorter 501 as shown, for e.g., in FIG. 5; alternately, each shelf 536 can also be located above sorter 501 (not shown).

In one embodiment, conveyance device (such as, for e.g., a conveyor belt or receptacle transport device 520) delivers empty receptacles 401 to a location proximal the aisle where lift 301 is located so that lift 301 can pick up the empty receptacles 401 and transfer them into or to storage location 528 of shelf 536 to be held until needed. Server 502 directs this task of picking up the empty receptacles 401 and transferring them into storage location 528 of shelf 536 when there are no other tasks related to completed-order receptacle for lift 301 to perform at that time.

In one embodiment, lift 301 comprises a crane. In one embodiment, frame 518 along and lift 301 are provided as a single integral unit. In one embodiment, frame 518 along with its lift 301 is augmented or replaced by a vertical gantry crane system set up. In one embodiment, receptacle transport device 520 is an AMR that travels on the floor. In one embodiment, receptacle transport device 520 is replaced with a conveyor belt system that transfers a full or complete order receptacle placed thereon by lift 301 to a location of further processing.

In various embodiments, each receptacle 401 comprises one or more receptacle side walls and a floor that together define a receiving space for receiving therein one or more articles 107. In one embodiment, system 500 further comprises at least one sleeve for detachably coupling with, attaching to, fitting within, fitting over, or cooperating with, a top region of receptacle 401 such that a lower sleeve portion of the sleeve contacts or abuts or is otherwise juxtaposed to a receptacle inner surface of the at least one receptacle side wall of receptacle 401, with a upper sleeve portion of the sleeve extending upward above a top rim of receptacle 401, with the sleeve thereby defining a sleeve access opening that permits access to the receiving space of the receptacle 401. The sleeve may be inserted into the receptacle 401 and helps to temporarily extend the sides of receptacle 401 upward and thereby temporarily increases the article holding or article carrying capacity of receptacle 401. The combination of the sleeve and the receptacle 401 in such a set up provides for more volume than what the available volume (for accommodating articles) would have been with just the receptacle 401 without sleeve attached thereto.

In various embodiments, receptacle bank 570 comprises one or more chambers or spaces with each space configured for receiving a receptacle 401. In one embodiment, a receptacle transport device 520 provided as part of system 500 operates to directly unload filled receptacles 401 carried on receptacle bank 570, and receptacle transport device 520 may further operate to transport empty receptacles that are to replace the filled receptacles 401. In some embodiments, lift 301 operates to load and unload receptacles 401 carried on receptacle bank 570. In at least one embodiment, system 500 further comprises one or more transport devices 412 for transporting and depositing articles 107 into the receptacles 401.

In at least one embodiment, server 502 is in communication with a sensor configured to sense that the empty receptacle 401 is ready to receive articles 107. In one embodiment, system 500 is further configured to verify that there is at least one non-full receptacle 401 available for deposition of articles 107 thereinto, and when this is not the case, server 502 may generate a notification indicating the same for a human operator's attention. In at least one embodiment, when a receptacle 401 has become full or otherwise reaches the desired fill level or has received all articles associated with an order that has been assigned to that receptacle, server 502 directs lift 301 to transfer the receptacle 401 containing the sorted articles to a storage location 528 of shelf 536 for buffering. Server 502 may later direct a receptacle transport device 520 to transport the transferred receptacle 401 to a location of further processing. In one embodiment, the location of further processing is a packing station.

In one embodiment, lift 301 forms an integral part of frame 518. In such an embodiment, frame 518 is configured to be fixed on at least one goods rack such as shelf 536. Frame 518 may include an upper horizontal guide track and a lower horizontal guide track, wherein the upper horizontal guide track and the lower horizontal guide track are respectively fixed to an upper portion and a lower portion of shelf 536. The upper horizontal guide track and the lower horizontal guide track may be in parallel. Shelf 536 is configured to store at least one receptacle 401 in a storage location 528 provided therein. A first vertical rod is provided such that an upper portion of the first vertical rod is hinged to a first upper driving bracket. The first upper driving bracket is provided with a first upper roller. A lower portion of the first vertical rod is hinged to a first lower driving racket, and the first lower driving bracket is provided with a first lower roller. A second vertical rod is provided such that an upper portion of the second vertical rod is hinged to a second upper driving bracket. The second upper driving bracket is provided with a second upper roller. The lower portion of the second vertical rod is hinged to a second lower driving bracket. The second lower driving bracket is provided with a second lower roller. At least one of the first upper roller and the second upper roller is configured to be driven by an electric motor. At least one of the first lower roller and the second lower roller is configured to be driven by an electric motor. The first upper roller and the second upper roller are configured to roll back and forth only along the upper horizontal guide track whereas the first lower roller and the second lower roller are configured to roll back and forth only along the lower horizontal guide track. An upper connecting rod is provided such that the two ends of the upper connecting rod are fixed to the first upper driving bracket and the second upper driving bracket, respectively. A lower connecting rod is provided such that the two ends of the lower connecting rod are fixed to the first lower driving bracket and the second lower driving bracket, respectively.

In one embodiment, a sensor forming part of system 500 detects a fill level of receptacle 401. In various embodiments, the sensor is in wired or wireless communication with one or more secondary sensing devices. Each of sensor and secondary sensing device may be configured to sense the filling level of a receptacle 401, for e.g., to sense whether a receptacle 401 is empty, underfilled, filled, or overfilled. In at least one embodiment, after system 500 identifies that a specific receptacle 401 has been filled as determined by one or more of sensor and the secondary sensing device, and system 500 determines that no more optional grooming of articles within the specific receptacle 401 is required or needed, server 502 directs lift 301 to transfer the receptacle 401 from an article receiving position 403 to one of: (a) a storage location 528 of the shelf 536, and (b) a position about a receptacle transport device 520. According to various embodiments that include grooming or compressing operations, system 500 is further configured to transmit information indicating that the first receptacle 401 is ready to be compressed, at which point the first receptacle 401 can be compressed either manually or by automated means. According to various embodiments, system 500 is optionally further configured to transmit information indicating that the first receptacle 401 is ready to be compressed for a second time; in such an embodiment, there may be more than one instance of compression the articles deposited into the first receptacle 401.

In various embodiments, transport devices 412 may traverse a surface, floor area, or a platform such as platform 508 to deposit a first number of articles into receptacles 401. In at least one embodiment, system 500 is configured to assign a second number of articles to a second receptacle 401. In at least one embodiment, system 500 is configured to re-assign some of the articles previously assigned to the first receptacle 401 to a second receptacle 401.

System 500 comprises, or is in communication with, a destination information database 512 and with server 502 of system 500. System 500 is configured to use data available at destination information database 512. In some embodiments, based on the data available at destination information database 512, server 502 is further configured to optimize the total distance that needs to be traveled by one or more transport devices to fill a particular receptacle such that the total distance traveled by all transport devices 412 to fill that receptacle is minimized whenever possible. For example, in one implementation, a destination that is expected to receive the greatest number of articles therein is assigned to one or more receptacles that are located closest to an article induction point; this advantageously ensures that the multiple trips needed to fill a particular high demand destination involve the shortest travel durations or the shortest (one-way or two-way) travel distances.

In various embodiments, transport device 412 can comprise an automated mobile robot (AMR), a computer-controlled vehicle, a track-arranged device, an overhead transport device, a pedestal robot, a personal AMR, a pick assist AMR, an automated conveyor system, or any similar automated transport or transfer device. In at least one embodiment, transport device 412 traverses a first surface, floor area, platform, or a track arrangement. In some embodiments, transport device 412 may comprise a conveyor. FIG. 2 depicts an example automated transport device such as transport device 412 traveling on platform 508 for carrying, moving, or transporting an article such as first article 107 to be sorted to a receptacle.

In one implementation, system 500 conducts sortation operations using transport devices 412 in the form of autonomous mobile robots (AMRs). In this implementation, a given AMR has been routed to a receptacle and the system recognizes that the receptacle is full. AMRs which are enroute to a destination receptacle which is determined to be filled up after an AMR has been dispatched by the system to deliver an article to closes, the AMR is re-routed to the new receptacle. The event of a destination receptacle being filled up can be determined by a sensor at the location that communicates this information to server 502, or by server 502 that calculates the total cubic volume or total weight of all of the articles sorted into that destination receptacle. Server 502 re-routes any enroute vehicles from the filled or overfilled receptacle location to a new receptacle's physical location. Any subsequent articles destined for the filled or overfilled receptacle destination are routed to the new receptacle's physical location. Server 502 initiates or directs the change-out or grooming of the filled or overfilled receptacle or the changeout of the receptacle bank containing the filled or overfilled receptacle. This initiation may be in the form of a message to another system that controls various components of the sorting operations, or in the form of an indication to a human operator via lights, sounds, signals sent to a handheld computer, etc. When the change-out or grooming is complete, the change-out or grooming automation mechanism or human operator may send a confirmatory message to the server indicating that the location is available for another or the same assignment.

System 500 may further include an input article region that functions to hold articles prior to sorting. In one variation, the input article region includes one or more input article holders that contain unsorted articles. The article holders can be placed adjacent to article information acquisition device 506 and are preferably within the reachable range of article information acquisition device 506. In one embodiment, one or more articles may be supplied such that an article identifier (or property) is already known to system 500 when article information acquisition device 506 interacts with the article whereby a receptacle 401 may be associated with the article prior to placement of the article on a transport device 412. In one embodiment, the order of article selection by system 500 may factor in the capacity levels of receptacles such that an article is dispatched after server 502 determines that an associated receptacle 401 has capacity to receive the article.

Article information acquisition device 506 may include one or more sensors configured for article identification. This could include a sensor for scanning a barcode and/or an RFID (Radio Frequency Identification) tag reader. In one exemplary implementation, system 500 may include 4 barcode scanners: two side scanners, one top scanner, and a bottom scanner. The two side barcode scanners can capture barcodes on the sides of articles while rotating the article. The top scanner can capture barcodes from up top such as after article placement in a transfer tray or the article tray. The bottom scanner can capture barcodes from below as the article is removed from the article receptacle. A transparent shield can be placed above the bottom scanner so that if an article is dropped it will deflect off the shield. Any suitable sensing system may be used for collecting information of an article that can be used to determine a destination output receptacle.

Article information acquisition device 506 may further function to collect data of the objects and the environment. In one embodiment, article information acquisition device 506 includes an imaging system, which functions to collect image data. The imaging system can include at least one imaging device with a field of view of a region of interest that covers a region where the article is transferred to a transport device 412 and the input article region. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used. Article information acquisition device 506 may collect data that is communicated to the server 502 to facilitate article placement onto a transport device. For example, image data of a collection of articles in the input article region can be processed by an analysis model that outputs one or more sortation plans (e.g., points for article selection, or motion plans for approaching, and picking up an article).

Article information acquisition device 506 may additionally or alternatively include one or more sensors for article dimensioning. Article information acquisition device 506 could include one or more dimensional camera (e.g., a depth sensor) or similar other sensor system for dimensioning the article. Dimensioning can include determining spatial characteristics of the article (i.e., article dimensions). In one implementation the article dimensions can include defining a bounding volume of the article (e.g., a width, height, and depth of the article). The article dimensions may be used at least in part in planning placement orientation during induction and sortation into a receptacle 401. Other sensors such as load cells, proximity sensors, RFID tracking systems, and the like may also be used to monitor status of various aspects of system 500. System 500 may additionally include other supplementary systems such as, for e.g., label printer and applicator, which function to enable labels to be produced and applied to an article prior to sortation.

System 500 may additionally include a receptacle capacity sensor that functions to measure the capacity level of an article receptacle. A variety of sensing technologies may be used for these purposes. In one implementation, a depth sensor or an imaging system can be downwardly attached to a surface such as platform 508. The depth sensor can detect or collect image data used in predicting the capacity level of an article receptacle as it passes over the article receptacles. The capacity of an article receptacle may be measured each time an article is deposited into it. The receptacle capacity sensor is in one- or two-way communication with server 502. In one variation, the output receptacle capacity sensor is coupled to platform 508 or to transport device 412 such that the output receptacle capacity sensor can be moved across an array of receptacles 401. The capacity of a receptacle 401 may be measured as the capacity sensor passes over a receptacle during use of the transport device 412 such as when in transit and/or while depositing an article. Further, platform 508 may be equipped with sensors or other elements that can act on an article being sorted. In particular, platform 508 could include a weight sensor so that articles could be weighed prior to being transferred to a transport device. In one example, the weight sensor could be a load cell (or other sort of pressure sensor, strain sensor, digital scale, or the like to estimate/measure weight) integrated into a transfer tray.

In one implementation, article information acquisition device 506 interacting with the article can include determining an identifier of the article. This may be used when information concerning the identity of the article is unknown prior to picking the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

After determining the identifier of the article, the system may determine a targeted article receptacle of the article based on the identifier of the article. In other words, an article can be picked and scanned to determine its identity, and then based on the identity query a database to determine which one or more targeted article receptacle to associate with the article. The system can then facilitate sorting the article into the targeted article receptacle such as receptacle 401.

According to at least one embodiment, server 502 operates to manage the sort destinations using at least 3 main parameters or fields: receptacles, physical locations, and logical destinations. In various embodiments, the destination associated with a receptacle 401 may represent: an order, a store, a shipping route, carrier, zip code, city, and a similar other characteristic. In at least one embodiment, there are multiple receptacles associated with one destination ID, e.g., when a store order requires more than will fit in one receptacle. Accordingly, in at least one embodiment, server 502 uses physical locations (rather than receptacles) to sort articles and to direct transport device 412 for sorting articles into receptacles.

In some implementations, one or more components such as receptacle exchange engine 422 and destination information database 512 may reside external to server 502 but nonetheless in communication with server 502. System 500 further comprises or is in communication with sensors, transport devices 412, and one or more receptacles 401. System 500 includes additional components such as article information acquisition device 506 (e.g., a scanner, image capturing equipment, or similar other equipment), and a wireless access point 514, among others. System 500 may further include sleeves fitted onto or configured for fitting onto receptacles 401, wherein system 500 operates to sort a plurality of articles to a receptacle 401 pre-fitted with a sleeve, the plurality of articles comprising a first article 107.

In various embodiments, server 502 is a control server that is configured for communicating with one or more components of system 500 as described herein, and as shown, for example, in FIG. 1. In one implementation, server 502 includes memory, a processor, and/or one or more communication interfaces communicatively coupled to each other. A network may form part of system 500, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, transport devices 412 that are computer-controlled or automated, and server 502 may communicate over the network with the cloud. In some implementations, one or more components of system 500 may reside in the cloud. For example, in one implementation, server 502 may reside in the cloud. In at least one implementation, server 502 may be in communication with one or more third-party servers, such as warehouse management system servers and automated transport device operations control servers.

Embodiments of the presently disclosed subject matter operate to advantageously overcome the limitations of the art by providing for systems, apparatus and processes that provide for an improved sorting solution for parcels and articles that optimize available space capacity as well as time in a cost-effective manner while minimizing the time requirement associated with the replacement of a filled receptacle with an empty receptacle.

Herein, reference made to "articles" characterizes the objects subjected to sortation by a sorting system. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as receptacle 401, which is used to characterize the receptacle used to hold articles once sorted. The form factor and variety of the receptacles can vary greatly, and the system may be adapted to different types of receptacles such as boxes, receptacles, trays, bags, gaylords, and the like. Article receptacles may use any suitable form factor and, in some cases, may use the same type of receptacle. In some variations, the form factor may be customized for particular variations and implementations of system 500 as described herein.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components of system 500 may be in communication with one or more other components through a wired and/or a wireless network. For example, the cloud, the server 502 may further communicate with receptacles 401, receptacle exchange engine 422, article information acquisition devices 506, automated transport devices 412, receptacle transport device 520, destination information database 512, sensors, and wireless access point 514 over a network.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

In one exemplary application, system 500 can be used for consolidating parcels for shipping. For example, a parcel processing site may use system 500 to sort parcels by destinations (e.g., zip codes or delivery routes) for subsequent shipment processing. Unsorted letters and/or packages can be collected into large article receptacles and then system 500 can facilitate sorting those into smaller article receptacles for different delivery routes/destinations. There is a high need for compact and modular sortation of articles beyond parcels though and system 500 can similarly be applied to those applications.

In another exemplary application, system 500 can be used for returned good processing and/or good restocking. For example, mixed article receptacles of returned goods could be appropriately sorted for reshelving, restocking, or other subsequent processing. In another example, newly received article orders could be sorted into appropriate receptacles for replenishing article stock within a store. The size and automated affordances of system 500 is such that it could be used in a variety of environments such as in a back-warehouse of a retail store or in an order fulfillment center (e.g., such as for ecommerce returns).

In another exemplary application, system 500 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In an analogous manner, system 500 may also be used for dynamic or custom kitting for industrial or consumer goods.

Article receptacles may be generally signaled for discharging (using an autonomous or semi-autonomous approach) when the article receptacle satisfies a capacity condition. The capacity condition may be based on how full the article receptacle is or whether an order has been completed. However, the method can additionally model expected time and availability to exchange an article receptacle. For example, an article receptacle may be removed before it is at a capacity limit to avoid having too many article receptacles needing exchange at the same time. As another condition, an article receptacle may be discharged when the method determines a benefit to having a different mix of groupings allocated within the receptacle array. For example, an uncommon article receptacle may be discharged when it has few articles such that a new article receptacle placed in that position can be reassigned to a different grouping.

System 500 may provide a number of potential benefits as noted herein. System 500 is not limited to always providing such benefits and is presented only as exemplary representations of how system 500 may be put to use. The list of benefits is not intended to be exhaustive and other benefits may additionally or alternatively exist.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for conducting operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system comprising:
   a server comprising a memory, a processor, and a receptacle exchange engine;
   a receptacle;
   a shelf comprising a plurality of storage locations arranged in one or more levels;
   a frame positioned adjacent the shelf, the frame comprising:
      a lift traveling about a vertical rail, the lift configured for transferring the receptacle to a storage location of the shelf, the vertical rail translating horizontally about two guide tracks arranged parallel to one another;
   wherein the system is configured to:
   determine, by the receptacle exchange engine, that the receptacle containing one or more sorted articles is ready to be transferred;
   direct, by the receptacle exchange engine, the lift to transfer the receptacle from an article receiving position to one of: (a) a storage location of the shelf, and (b) a position about a receptacle transport device.

2. The system of claim 1, wherein the system is further configured to direct, by the receptacle exchange engine, the lift to transfer an empty receptacle to the article receiving position.

3. The system of claim 1, further comprising two lifts, wherein a first lift transfers the receptacle from the article receiving position to a first storage location of the shelf and a second lift transfers an empty receptacle from a second storage location of the shelf to the article receiving position.

4. The system of claim 1, wherein the receptacle is transferred from the article receiving position to a receptacle-carrying surface of the lift by a manipulation of a transfer assembly of the lift.

5. The system of claim 4, wherein the transfer assembly comprises one or more of a: robotic picking machine, robotic pick-and-place machine, robotic pick-and-slide machine, robotic grasping assembly, robotic articulated arm with an end effector, mobile robot, lifting machine, dragging machine, suction divert machine, suction lift machine, hauling machine, forklifting machine, side-grip pulling machine, and sliding machine.

6. The system of claim 1, wherein the frame is one of: (a) fixedly attached to, and (b) removably attached to, the shelf.

7. The system of claim 1, wherein the lift is configured to receive: (a) a first receptacle on a first receptacle-carrying surface of the lift, and (b) a second receptacle on a second receptacle-carrying surface of the lift.

8. The system of claim 1, wherein the receptacle exchange engine determines that the receptacle is ready to be transferred after one of: (a) an order associated with the receptacle is completed, and (b) the receptacle is identified as being full.

9. The system of claim 1, wherein the article receiving position is proximal a platform raised from a floor, wherein the receptacle is placed on or about the floor, and wherein a computer controlled vehicle travels on the platform to sort articles into a plurality of receptacles.

10. The system of claim 9, wherein the two guide tracks run substantially parallel to an edge of the platform wherein a plurality of receptacles is placed in article receiving positions proximal an edge of the platform.

11. The system of claim 9, wherein comprising two or more platforms wherein a plurality of receptacles is placed in article receiving positions proximal an edge of each platform.

12. The system of claim 1, wherein the article receiving position is proximal a floor, wherein the receptacle is placed on or about the floor.

13. The system of claim 1, further comprising a receptacle transport device, wherein the system is further configured to direct the lift to transfer the receptacle from the storage location of the shelf to the receptacle transport device, wherein the receptacle transport device transports the receptacle to a location of further processing.

14. The system of claim 1, further comprising a receptacle transport device, wherein the system is further configured to direct the lift to transfer an empty receptacle carried by the receptacle transport device to the storage location of the shelf.

15. The system of claim 1, wherein one or more of: (a) the shelf, and (b) the frame includes wheels for providing mobility.

16. The system of claim 1, wherein the receptacle is elevated from a floor at the article receiving position.

17. A system comprising:
a server comprising a memory, a processor, and a receptacle exchange engine;
a receptacle;
a shelf comprising a plurality of storage locations arranged in one or more levels;
a receptacle bank comprising:
a plurality of spaces for receiving receptacles; and
a lift traveling about a vertical rail, the lift configured for transferring the receptacle to a storage location of the shelf, the vertical rail translating horizontally about two guide tracks arranged parallel to one another;
wherein the system is configured to:
determine, by the receptacle exchange engine, that the receptacle containing one or more sorted articles is ready to be transferred;
direct, by the receptacle exchange engine, the lift to transfer the receptacle from an article receiving position to one of: (a) a storage location of the shelf, and (b) a position about a receptacle transport device.

18. The system of claim 1, wherein the system is further configured to direct, by the receptacle exchange engine, the lift to transfer an empty receptacle to the article receiving position.

19. A system comprising:
a server comprising a memory, a processor, and a receptacle exchange engine;
a receptacle;
a shelf comprising:
a plurality of storage locations arranged in one or more levels; and
a frame attached to the one or more levels, the frame comprising: a lift traveling about a vertical rail, the lift configured for transferring the receptacle to a storage location of the shelf, the vertical rail translating horizontally about two guide tracks arranged parallel to one another;
wherein the system is configured to:
determine, by the receptacle exchange engine, that the receptacle containing one or more sorted articles is ready to be transferred;
direct, by the receptacle exchange engine, the lift to transfer the receptacle from an article receiving position to one of: (a) a storage location of the shelf, and (b) a position about a receptacle transport device.

20. The system of claim 1, wherein the system is further configured to direct, by the receptacle exchange engine, the lift to transfer an empty receptacle to the article receiving position.

* * * * *